R. W. MURRAY.
VALVE.
APPLICATION FILED JULY 15, 1918.
1,341,146. Patented May 25, 1920.
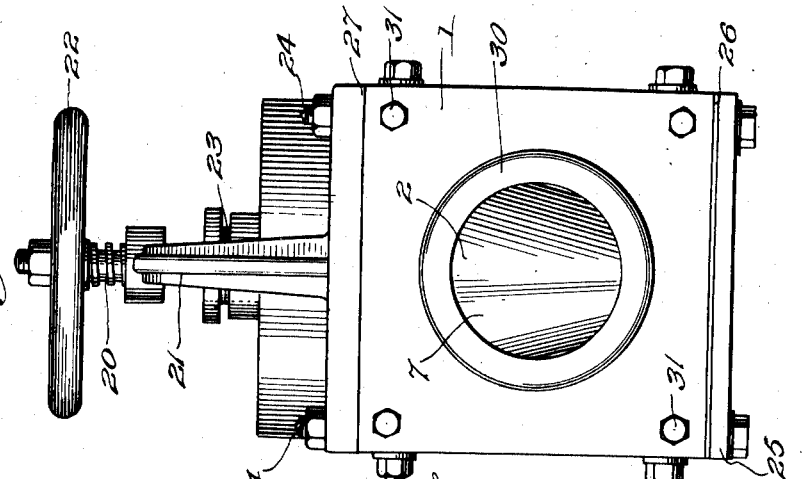
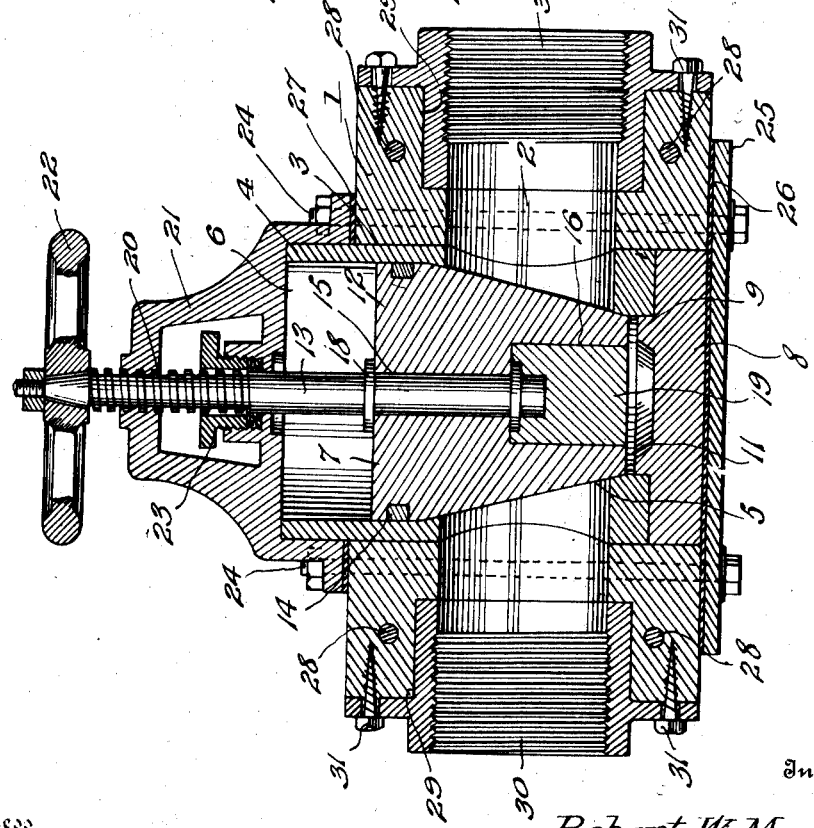
Witness
W. S. McDowell
Inventor
Robert W. Murray
By C. C. Shepherd
Attorney

UNITED STATES PATENT OFFICE.

ROBERT W. MURRAY, OF NEW LEXINGTON, OHIO.

VALVE.

1,341,146. Specification of Letters Patent. Patented May 25, 1920.

Application filed July 15, 1918. Serial No. 244,880.

*To all whom it may concern:*

Be it known that I, ROBERT W. MURRAY, a citizen of the United States, residing at New Lexington, in the county of Perry and State of Ohio, have invented certain new and useful Improvements in Valves, of which the following is a specification.

This invention relates to valves and is particularly directed as an improved type of valve constructed principally of wood designed for use in mines in order to remove the mine water which, in a great many instances, is very acidulous or contains other elements destructive or corrosive to metal parts. For this reason, I have designed my valve of wood and have paid particular attention to the manner in which the grain thereof is directed to prevent seepage therethrough as much as is possible, this latter forming one of the main objects of my invention.

My invention also resides in combining with a wooden body bored vertically and transversely, a liner member located in said transverse bore and adapted to coöperate with a valve plug which is also preferably made of wood.

Other objects of my invention reside in the construction of valve plug and in the construction of valve body all as will appear from the following description and the accompanying drawing in which similar characters of reference designate corresponding parts in said drawing.

Figure 1 is a view in end elevation of my improved type of valve, and

Fig. 2 is a longitudinal vertical section taken through the structure as shown in Fig. 1.

The valve body itself is designated by the reference numeral 1 and is formed preferably of a single piece of wood bored longitudinally as shown at 2 and transversely as is shown at 3. It is in this transverse bore that the valve plug itself is designed to operate and this transverse bore is provided with a wooden liner 4 which is also bored transversely so that the grain thereof will run in the direction of movement in the valve plug itself. This liner is provided with a tapered bore 5 at its lower end or at the point where it intersects the longitudinal bore 2 of the body 1 and is also provided with a cylindrical bore 6 at its upper end within which the valve plug 7 moves. The lower end of the transverse bore 3 is closed by means of a stop plug 8 arranged so that its grain runs longitudinally of the valve body or in the same direction as that of the valve body itself which prevents the seepage of water therethrough. The upper end of this plug 8 contains a cylindrical boss 9 designed to accurately fit the lower cylindrical bore 11 which forms the terminating end of the taper bore 5. The valve plug 7 is constructed of wood and is provided with a tapered portion to fit the taper of the liner and also a cylindrical upper portion 12 designed to fit the cylindrical bore 6. In order to prevent leakage at this point and also for preventing the water passing therethrough from coming into contact with the valve stem 13, I form a packing between the cylindrical portion 12 and the cylindrical bore 6, which packing is shown in the nature of a piston ring 14. In this manner, the valve plug may be moved up and down and still maintain a tight fit within the cylindrical bore to prevent leakage. As a rule, the valve stem 13 is made of metal although this is not necessary. However, where the packing 14 is sufficiently tight, it is entirely permissible. The valve plug 7 is bored centrally as shown at 15 and its lower end is counter-bored as shown at 16. The valve stem 13 is mounted in position within the bore 15 and the head 17 then applied, which head, coöperating with the shoulder portion 18, holds the valve plug securely in position. The head 17 is then covered by means of a vertical wooden plug 19 which is driven into position as is shown. This valve stem is provided with threads at its upper end as is indicated at 20 and projects out of the top of the valve body to come into threaded engagement with the bracket portion 21. The valve stem itself carries an operating handle 22 at its upper end and is suitably packed within the bracket 21 as is shown at 23.

From the description thus given, it will be apparent that the valve stem 13 is rotatably secured within the wooden valve plug 7 and that rotation of this stem causes the plug to be elevated because of the threaded engagement between the stem and bracket 21 thus opening a passage through the longitudinal bore 2. The water may be permitted to flow therethrough but is prevented from entering the space above the valve plug because of the packing 14. The remaining parts are all suitably closed to prevent the outflow of water and also for preventing this water from coming into contact with any metal parts.

The bracket 21 is secured in position by means of a plurality of bolts 24 which pass through the body from top to bottom but do not intersect any of the bores and are secured against a face plate 25 at their lower ends between which and the body 1 a gasket 26 is inserted, similarly, a gasket 27 is located beneath the bracket 21 and the upper surface of the body. By means of these bolts, the entire body portion is reinforced against warping or cracking while a second set of bolts 28 pass transversely through the body but at right angles to the bolts 24. In this manner, the entire body portion 1 is completely reinforced against any destroying influences.

The longitudinal bore 2 is preferably counter-bored at each end as shown at 29 within which the end of a wooden pipe may be driven if desired. If it is not desired to use a wooden pipe, a fitting such as is shown at 30 may be employed and seated within this counter-bore portion and held in place by means of the screws shown at 31.

From the foregoing description, taken in connection with the accompanying drawing, it will be apparent that I have provided a valve which possesses considerable utility and one which will last longer than the metallic valves used at present. This valve may be operated to either open or close the same by means of the handle 22 but in doing so, none of the water is permitted to come into contact with any of the metal valve parts.

What I claim is:

1. A valve comprising a wood body portion bored longitudinally and having a transverse valve opening tapered during its intersection with said bore and cylindrical above it, a wood valve plug tapered to fit said tapered seat, means for packing the upper portion of said plug where it moves up and down in the cylindrical portion of said valve opening against leakage, and means for moving said plug up and down in said valve opening.

2. A valve comprising a wood body portion bored longitudinally and transversely, a wood liner in said transverse bore and itself having a cylindrical bore at its upper end and a tapered bore where it intersects said longitudinal bore, a wood valve plug cylindrical at its top and tapered at its other end to fit said tapered bore, a packing between the cylindrical portions of said plug and said transverse bore to guard against leakage during the up and down movement of said plug, and means for moving said plug up and down in said transverse bore.

3. A valve of the class described, comprising a wooden body portion formed to provide a longitudinally extending bore and an intersecting and tapered transverse bore, a tapered wooden valve plug disposed for sliding movement within said transverse bore, said plug being capable of obstructing the flow of fluid through said longitudinal bore when occupying its closed position, and metallic operating means for effecting the opening and closing movements of said plug, said means being entirely out of contact with the fluid contained by said valve.

4. A valve of the class described, comprising a wooden body formed to provide a longitudinally extending bore and a tapered bore transversely intersecting said longitudinal bore, a wooden valve plug formed to fit and to be slidably received within said transverse bore, whereby when in a closed position said plug will serve to obstruct the flow of fluid through said longitudinal bore, and mechanism out of contact with the fluid contained within said valve for effecting the operation of said plug.

5. A valve of the class described, comprising a wooden body formed to provide a longitudinally extending bore and a transverse intersecting tapered bore, a wooden valve plug formed to fit within and to be slidably received by said transverse bore, said plug being capable when in a closed position of obstructing the flow of fluid through said longitudinal bore, mechanism completely out of contact with the fluid passing through said valve for effecting the operation of said plug, and reinforcing members passing vertically and transversely through said wooden body and serving to preserve the form of the latter.

6. A valve of the class described, comprising a body having a longitudinal bore formed therein, the walls of said bore being of a material opposed to corrosion, said body being further provided with a transverse bore intersecting said longitudinal bore, a liner of a material similar to the walls of said longitudinal bore disposed within said transverse bore, said liner having a tapered valve seat formed therein at its position of intersection with said longitudinal bore, a tapered plug having exterior walls of a noncorrosive material disposed to occupy the seat formed in said liner and when in a closed position to obstruct the flow of fluid through said longitudinal bore, and means completely out of contact with the fluid within said valve for effecting the operation of said plug.

In testimony whereof I affix my signature.

ROBERT W. MURRAY.